United States Patent [19]
Nishio et al.

[11] Patent Number: 5,233,253
[45] Date of Patent: Aug. 3, 1993

[54] MULTI-PHASE DC MOTOR

[75] Inventors: Akira Nishio; Masaru Kumazawa, both of Fujieda, Japan

[73] Assignee: Victor Company of Japan, Ltd., Yokohama, Japan

[21] Appl. No.: 801,339

[22] Filed: Dec. 2, 1991

[30] Foreign Application Priority Data

Nov. 30, 1990 [JP] Japan .................. 2-336796

[51] Int. Cl.$^5$ .............. H02K 1/06; H02K 3/04
[52] U.S. Cl. ................... 310/254; 310/179
[58] Field of Search ........... 310/177, 198, 181, 254, 310/269, 179; 29/596, 598

[56] References Cited

U.S. PATENT DOCUMENTS

| | | | |
|---|---|---|---|
| 4,575,652 | 3/1986 | Gogue | 310/49 R |
| 4,700,098 | 10/1987 | Kawashima | 310/186 |
| 4,719,378 | 1/1988 | Katsuma et al. | 310/67 R |
| 4,774,428 | 9/1988 | Konecny | 310/198 |
| 4,833,355 | 5/1989 | Kawashima | 310/198 |
| 4,847,712 | 7/1989 | Crapo | 360/99.08 |
| 4,967,464 | 11/1990 | Stephens | 29/596 |
| 5,006,745 | 4/1991 | Nishio et al. | 310/177 |

FOREIGN PATENT DOCUMENTS

| | | |
|---|---|---|
| 54-72410 | 6/1979 | Japan . |
| 62-16054 | 1/1987 | Japan . |
| 62-100154 | 5/1987 | Japan . |
| 62-123944 | 6/1987 | Japan . |
| 63-294243 | 11/1988 | Japan . |
| 63-316648 | 12/1988 | Japan . |
| 64-19949 | 1/1989 | Japan . |
| 2-142350 | 5/1990 | Japan . |

Primary Examiner—Steven L. Stephan
Assistant Examiner—D. R. Haszko
Attorney, Agent, or Firm—Lowe, Price, LeBlanc & Becker

[57] ABSTRACT

A first multi-phase dc motor comprising: a field-magnet portion having P field magnetic poles positioned as a circular array at angularly equally spaced intervals; and an armature having cores as angularly equally spaced N protruding poles providing N slots therebetween with $\phi$-phase coils disposed therein, either said field magnet portion or said armature being rotatable with respect to the other; and P, N, and $\phi$ being defined by $P=2n$, $N=2n\pm1$, and N is not m times $\phi$ wherein n and m are natural numbers.

A second multi-phase dc motor comprising: a field-magnet portion having P field magnetic poles positioned as a circular array at angularly equally spaced intervals; and an armature having cores as angularly equally spaced N protruding poles providing N slots therebetween with $\phi$-phase coils disposed therein, either said field magnet portion or said armature being rotatable with respect to the other; and P, N, and $\phi$ being defined by $P=2n$, $N=2(n\pm1)$, and N is not m times $\phi$. According to the invention, frequency of cogging per one turn is more than that of the conventional motor with the same number of magnet poles, so that degree of cogging torque is reduced.

14 Claims, 5 Drawing Sheets

MULTI-PHASE DC MOTOR

BACKGROUND OF THE INVENTION

1. Field of the Invention

This invention relates to a multi-phase dc motor and particularly relates to a multi-phase dc motor suitable for a hard disc system, a floppy disc system, or a video tape recorder.

2. Description of the Prior Art

Prior art multi-phase dc motors are designed with a given relation between the number of field magnetic poles P and the numbers of slots N. For example, in a three-phase dc motor of a prior art, there are relations as follows:

$$P = (3 \pm 1)n$$

$$N = 3n$$

If the motor is of a type with a core, a peak torque of cogging occurs when a border b between two neighboring poles confronts a slot. Therefore, a frequency of cogging per one rotation is determined by a least common multiple between N and P as shown in TABLE 1 and 2.

Hereinbelow will be described cogging developed in the prior art motor, for example, a motor having a structure shown in TABLE 1 with reference to FIGS. 7 and 8.

FIG. 7 is a cross-sectional view partially shown of a prior art multi-phase dc motor, that is, a three-phase eight-pole twelve-slot dc motor. TABLE 1 shows frequency of cogging with respect to n, N, and P when $P = (3-1)n$ where n is a natural number, N is the number of slots, and P is the number of field magnetic poles. TABLE 2 shows frequency of cogging with respect to n, N, and P when $P = (3+1)n$.

TABLE 1

| n | N | P | FREQ OF COGGING |
|---|---|---|---|
| 1 | 3 | 2 | 6 |
| 2 | 6 | 4 | 12 |
| 3 | 9 | 6 | 18 |
| 4 | 12 | 8 | 24 |
| 5 | 15 | 10 | 30 |
| 6 | 18 | 12 | 36 |
| . | — | — | — |

This prior art three-phase dc motor 3 comprises a core B having 12 slots Q and 12 coils L, a field magnet portion M having eight permanent magnetic poles as a circular array, these permanent magnetic poles being arranged at angularly equally spaced intervals around the core B, N and S poles being arranged alternately, and a yoke Y provided around the field magnet portion M. In this type of three-phase dc motor 3, either of the field magnet portion M or the core B is fixed and the other is rotatable.

TABLE 2

| n | N | P | FREQ OF COGGING |
|---|---|---|---|
| 1 | 3 | 4 | 12 |
| 2 | 6 | 8 | 24 |
| 3 | 9 | 12 | 36 |
| 4 | 12 | 16 | 48 |
| 5 | 15 | 20 | 60 |
| 6 | 18 | 24 | 72 |
| . | — | — | — |

In such three-phase dc motor 3, when either of the core B or the field magnet portion M is fixed and the other is rotated, cogging occurs. A peak torque of cogging occurs when a border between two neighboring poles confronts a slot. One protruding (salient) pole provided between two successive slots receives a cogging torque as the rotation between the core B and the field magnet portion M as shown by a waveform 101 in FIG. 8. FIG. 8 shows changes of cogging torque of the prior art motor 3. There are eight 12 slots in the field magnet portion M. Respective protruding poles receive cogging torques as shown by waveforms 101-108. Therefore, a total cogging torque is developed between the core B and the field magnet portion M as shown by waveform 109. There are 24 occurrences of coggings per one rotation. That is, this frequency is the least common multiple between the number of the magnet poles (P=8) and the number of slots (N=12).

In the prior art three-phase dc motor 3, the number of protruding poles where coggings occur at the same time is given by:

$$k = N \times P/\text{(the least common multiple between N and P)}$$

Therefore, a magnitude of the total cogging torque becomes large. For example, in the above-mentioned three-phase eight-pole twelve-slot dc motor 3, the total cogging torque T is given by:

$$T = kt = 12 \times 8t/24 = 4t$$

wherein t is a magnitude of cogging torque developed at one border g. Therefore, the total cogging torque is four times cogging torque developed at one border g. As a result, there is a problem that jitter, noise, or vibration occurs when such a three-phase dc motor 3 is used as a drum motor or a capstan motor of a video tape recorder.

In order to resolve this problem, there are various techniques disclosed, for example, Japanese patent publication Nos. 62-123944, 64-19949, 63-294234, and 63-316648. However, each of these documents only discloses a motor whose number of slots is m times the number of phases $\phi$ wherein m is natural number. That is, there is still a problem that jitter, noise, or vibration, occurs when a multi-phase dc motor whose number of slots is not m times the number of phases $\phi$ is used as a drum motor or a capstan motor of a video tape recorder.

SUMMARY OF THE INVENTION

The present invention has been developed in order to remove the above-described drawbacks inherent to the conventional multi-phase dc motor.

According to the present invention there is provided a multi-phase dc motor comprising: a field-magnet portion having P field magnetic poles positioned as a circular array at angularly equally spaced intervals; and an armature having a plurality of cores positioned as N angularly equally spaced protruding poles providing N slots therebetween with $\phi$-phase coils disposed therein, either said field magnet portion or said armature being rotatable with respect to the other; and P, N, and $\phi$ being defined by $P = 2n$, $N = 2n \pm 1$, and N is not m times $\phi$ wherein n and m are natural numbers.

According to the present invention there is also provided a multi-phase dc motor comprising: a field-magnet portion having P field magnetic poles positioned as a circular array at angularly equally spaced intervals; and an armature having a plurality of cores positioned as N angularly equally spaced protruding poles providing N slots therebetween with $\phi$-phase coils disposed therein, either said field magnet portion or said armature being rotatable with respect to the other; and P, N, and $\phi$ being defined by $P=2n$, $N=2(n\pm 1)$, and N is not m times $\phi$. In the motors of the invention frequency of cogging per one turn is more than that of the conventional motor with the same number of magnet poles, so that degree of cogging torque is reduced.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention with reference to tables and drawings.

Figure 1:
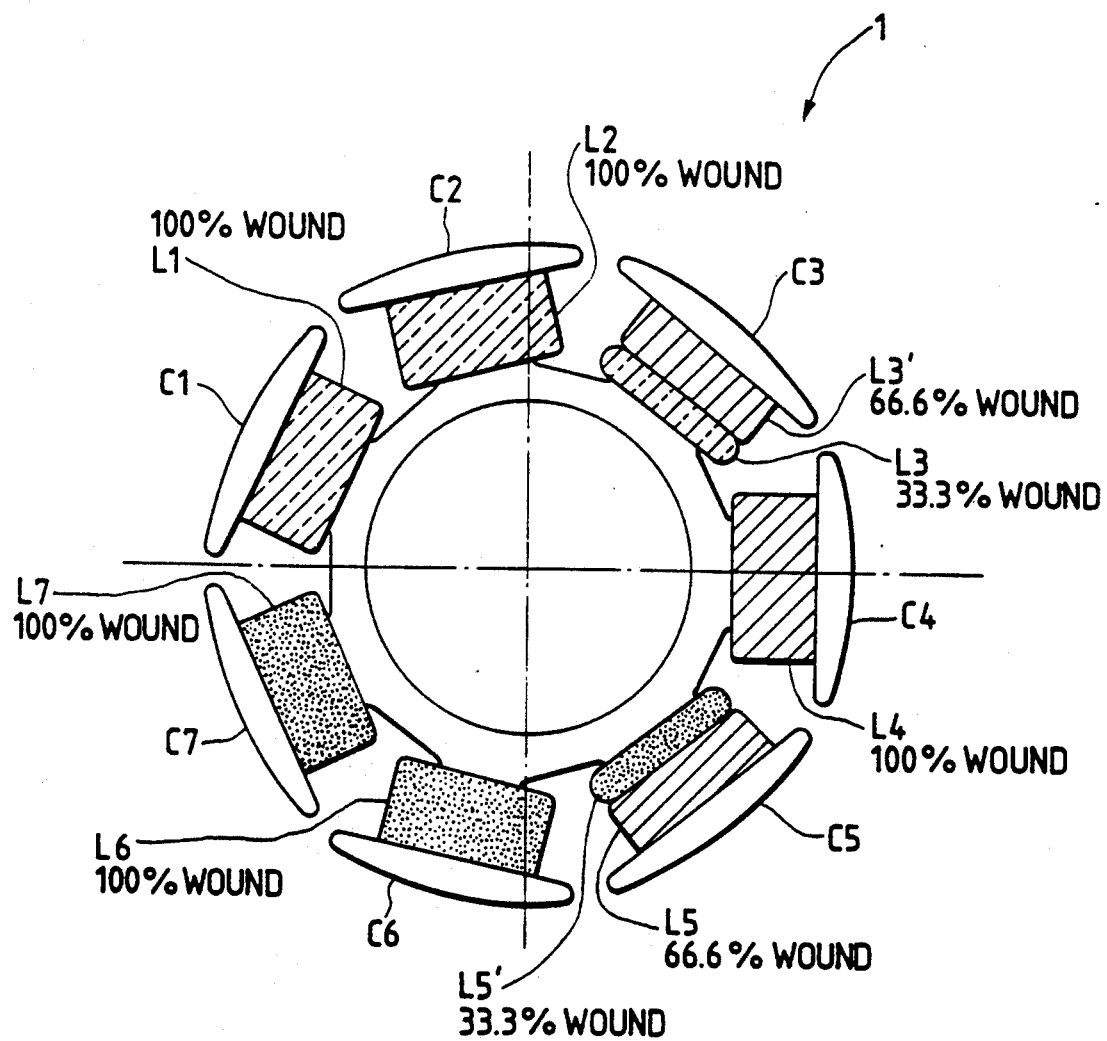
FIG. 1 is a schematic cross-sectional view of a first embodiment of the invention of a multi-phase dc motor.
Figure 5:
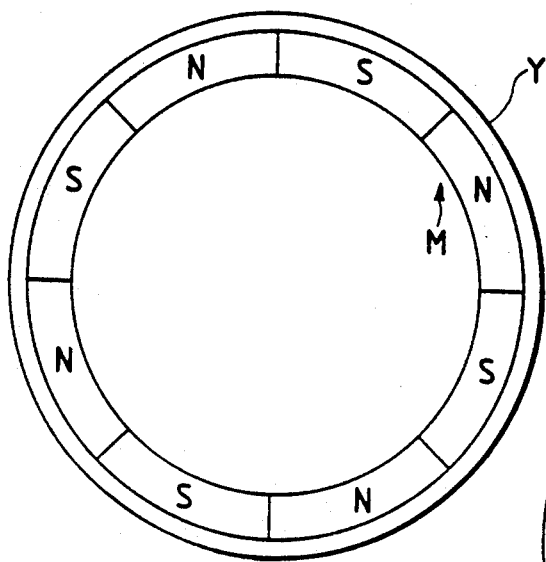
FIG. 5 is a plan view of a magnet portion M and yoke Y of the first embodiment.

FIG. 1 is a schematic cross-sectional view of the first embodiment of this invention of a multi-phase dc motor. FIG. 5 is a plan view of a magnet portion M and yoke Y of the first embodiment. These are coaxially assembled with core 1 with a given air gap g. However, for convenience of description, the core 1 and the magnet portion M are separately shown.

The motor of this embodiment is of eight-pole and seven-slot type and it comprises a core 1 having three-phase winding and seven slots, a field magnet portion M having eight permanent magnetic poles as a circular array arranged at angularly equally spaced intervals around the core 1, N and S poles of the magnet portion M being arranged alternately, and a yoke Y provided around the field magnet portion. In this type of three-phase dc motor, either of the field magnetic portion or the core 1 is fixed and the other is rotatable.

Because the motor of this embodiment is of eight-magnetic-pole and seven-slot type as mentioned above, the relation between the number P of magnet poles and the number N of slots corresponds the case of $n=4$ in the equation of $P=2n$ $N=2n-1$ Thus, $N/\phi=7/3=2.33\ldots$ This means that this combination of numbers satisfies a condition that N is not m times $\phi$ wherein m is a natural number.

Under this condition, assuming that a total amount or the number of turns of a winding of one of protruding (salient) poles C1 to C7 is 100%, the amounts of the windings of the respective protruding poles C1 to C7 with respect to U-phase, W-phase, and V-phase are shown in TABLE 3 which shows a relation between each phase and the amount of windings.

TABLE 3

| SALIENT POLE | U PHASE | W PHASE | V PHASE |
|---|---|---|---|
| C1 | 100% | | |
| C2 | 100% | | |
| C3 | 33.3% | 66.7% | |
| C4 | | 100% | |
| C5 | | 66.7% | 33.3% |
| C6 | | | 100% |
| C7 | | | 100% |
| TOTAL | 233.3% | 233.4% | 233.3% |

That is, the windings of the protruding poles C1 and C2 include 100% U-phase windings respectively. The windings of the protruding poles C6 and C7 include 100% V-phase windings respectively. The windings of the protruding poles C3 includes 33.3% U-phase winding and 66.7% W-phase winding. The winding of the protruding poles C4 includes 100% W-phase windings. The windings of the protruding pole C5 includes 66.7% V-phase and 33.3% V-phase windings. Total amount of winding of each phase is 233.3% (cut away below the first place of decimals).

Hereinbelow will be described operation of the first embodiment.

Figure 2A:
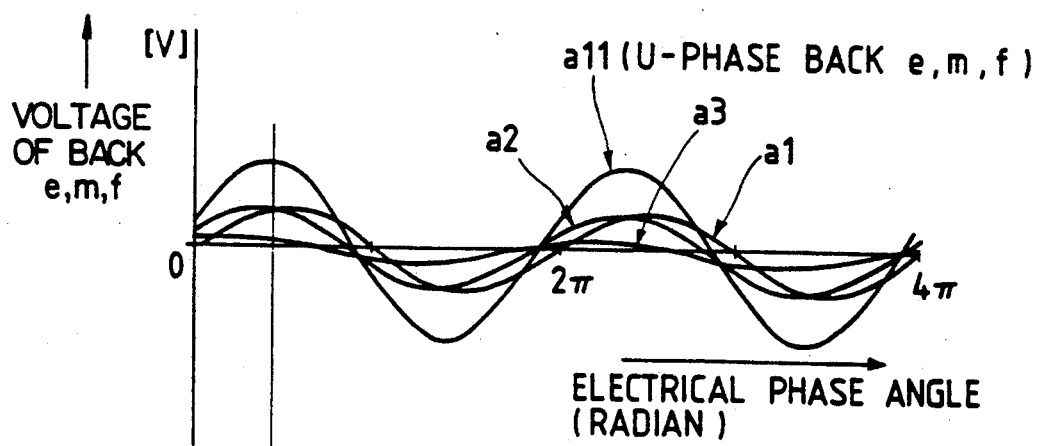
FIG. 2A shows waveforms of back-electromotive forces in U-phase of the first embodiment.
Figure 2B:
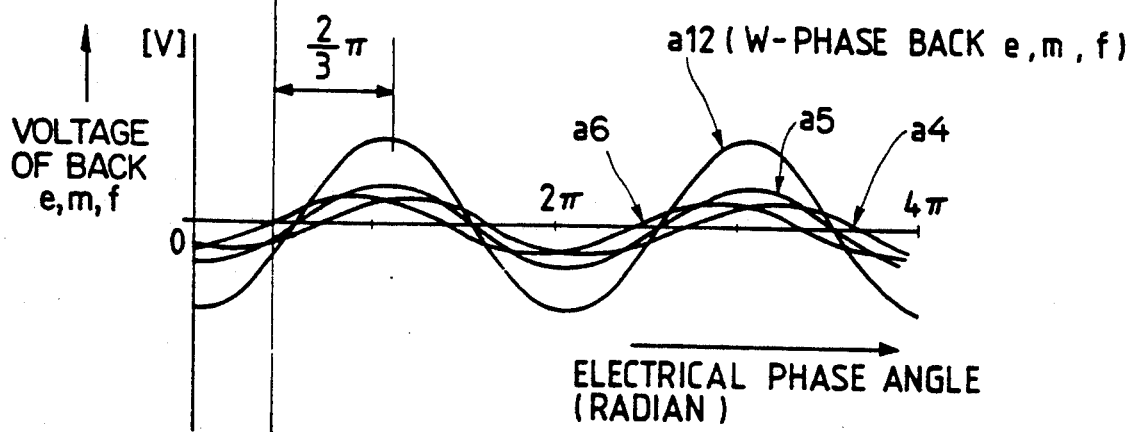
FIG. 2B shows waveforms of back-electromotive forces in W-phase of the first embodiment.
Figure 2C:
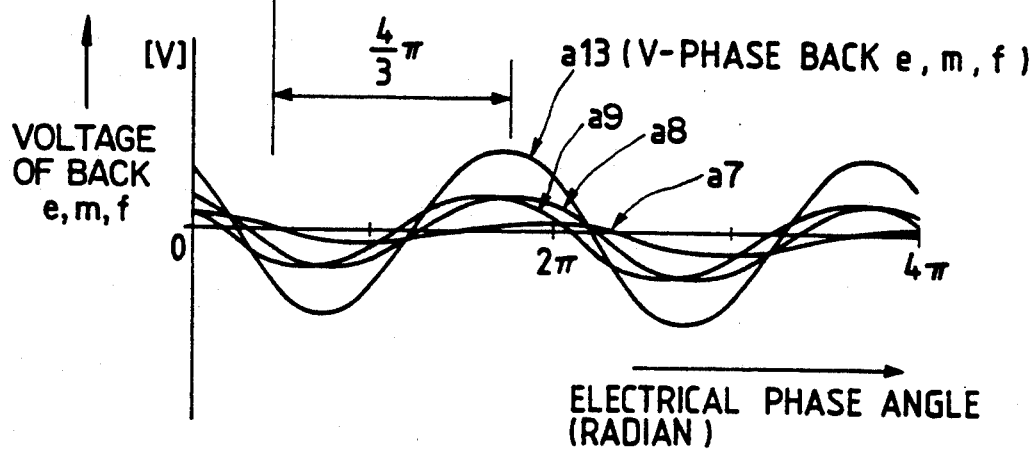
FIG. 2C shows waveforms of back-electromotive forces in V-phase of the first embodiment.

FIG. 2A shows waveforms of back-electromotive forces in U-phase. FIG. 2B shows waveforms of back-electromotive forces in W-phase. FIG. 2C shows waveforms of back-electromotive forces in V-phase. A waveform a1 is a back-electromotive force when a coil L1 is fully wound around the protruding pole C1 clockwise (hereinafter referred to as CW). A waveform a2 is a back-electromotive force when a coil L2 is fully wound around the protruding pole C2 counter-clockwise (hereinafter referred to as CCW). A waveform a3 is a back-electromotive force when one coil L3 is 33.3% wound around the protruding pole C3 CW. The U phase of this motor is obtained from a combined voltage waveform a11. That is, it is obtained from a series circuit of these coils L1, L2, and L3.

Similarly, in FIG. 2B, a waveform a4 is a back-electromotive force when a coil L3' is 66.7% wound around the protruding pole C3 CW. A waveform a5 shows a back-electromotive force when a coil L4 is fully wound around the protruding pole C2 CCW. A waveform a6 shows a back-electromotive force when a coil L5 is 66.7% wound around the protruding pole C5 CW. The W phase of this motor is obtained from a combined voltage waveform a12. That is, it is obtained from a series circuit of these coils L3', L4, and L5.

Similarly, in FIG. 2C, a waveform a7 shows a back-electromotive force when a coil L5' is 33.3% wound around the protruding pole C5 CW. A waveform a8 shows a back-electromotive force when a coil L6 is fully wound around the protruding pole C6 CCW. A waveform a9 shows a back-electromotive force when a coil L7 is fully wound around the protruding pole C7 CW. The V phase of this motor is obtained from a combined voltage waveform a13. That is, it is obtained from a series circuit of these coils L5', L6, and L7.

Figure 3:
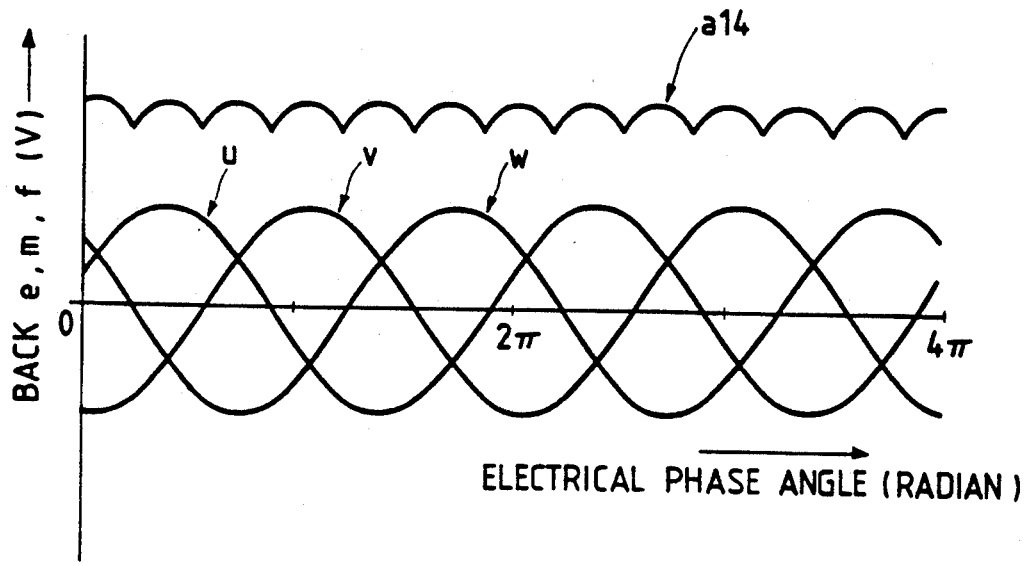
FIG. 3 shows change of back electromotive forces of three phases of the first embodiment.

As mentioned above, U, V and W phases are obtained by combining of back electromotive forces developed in three sets of coils, namely, coils L1, L2, and L3, coils L3', L4, and L5, and coils L5', L6, and L7, so that there are 120 degrees of phase differences among these phases as shown in FIG. 3 showing change of back electromotive forces of three phases of the first embodiment. Therefore, the motor of the first embodiment operates as a three-phase motor. The waveform a14 shows torque ripple of the first embodiment of the motor.

The frequency of cogging per one rotation of this motor is 56, so that degree of cogging torque is reduced because the more frequency of coggings the smaller the degree of cogging torque.

Figure 7:
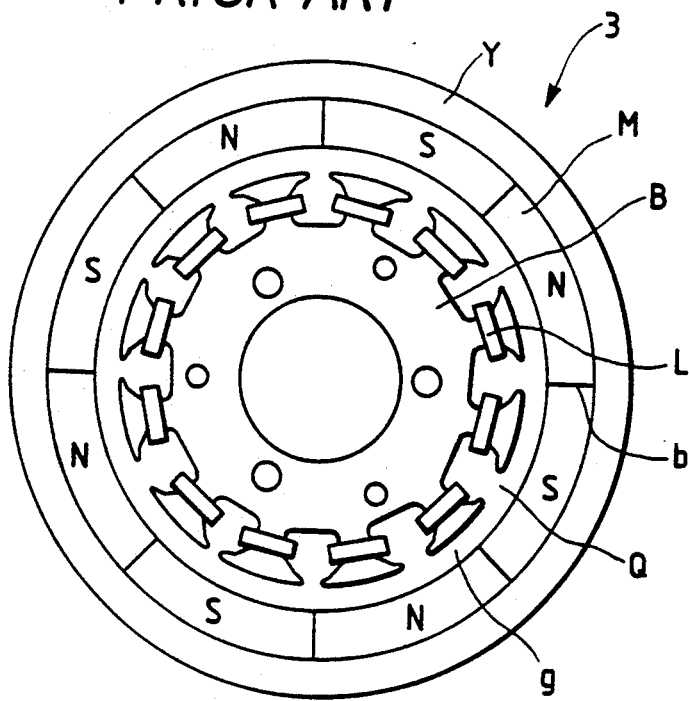
FIG. 7 is a cross-sectional view partially shown of a prior art multi-phase dc motor.
Figure 8:
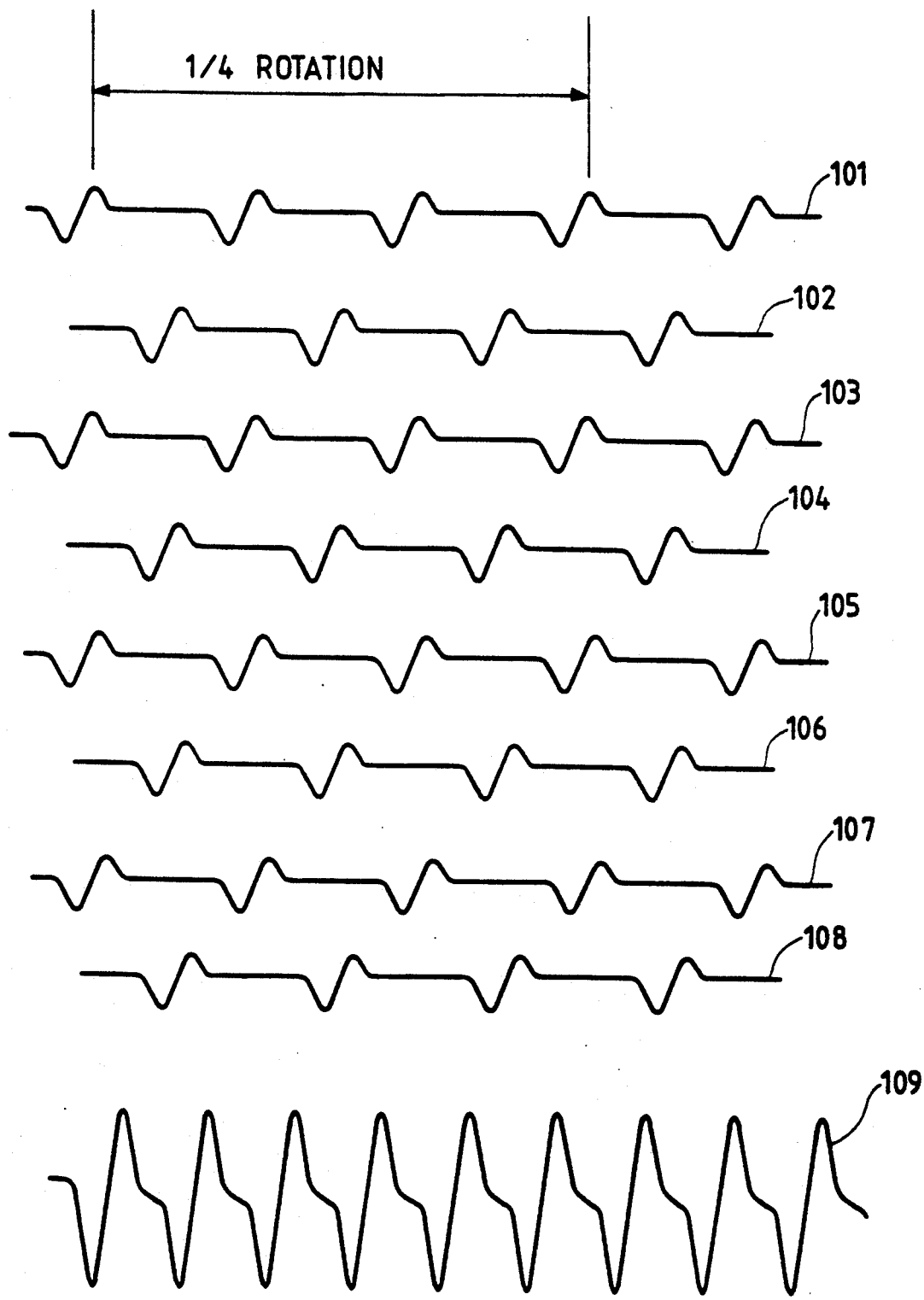
FIG. 8 shows changes of cogging torque of the prior art motor.

Moreover, a space factor of this motor having this eight-magnetic-pole seven-slot structure is larger than that of the prior art motor 3 shown in FIG. 7 as shown in TABLE 4 which shows relation of space factors and frequencies between the motor of the first embodiment and the prior art motor 3 shown in FIG. 7.

TABLE 4

|  | SPACE FACTOR | FREQUENCY OF COGGING |
|---|---|---|
| PRIOR ART 8 POLE 6 SLOT TYPE | 100% | 24 |
| 8 POLE 7 SLOT TYPE OF THIS INVENTION | 116% | 56 |

Hereinbelow will be described a second embodiment of the invention.

Figure 4:
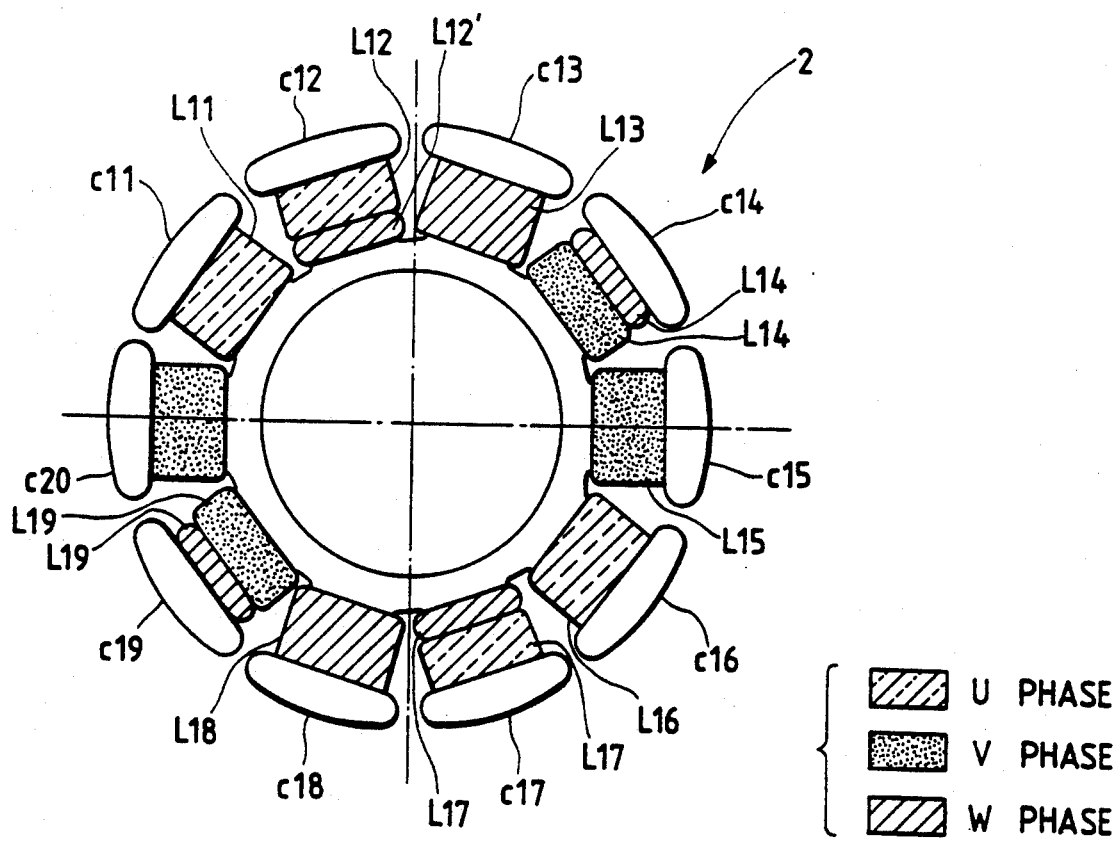
FIG. 4 is a schematic cross-sectional view of the second embodiment of multi-phase dc motor.
Figure 6:
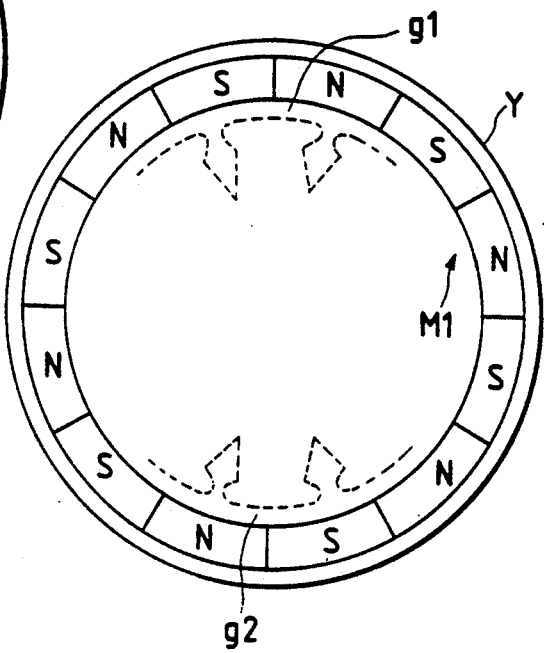
FIG. 6 is a plan view of a magnet portion M1 and yoke Y of the second embodiment.

FIG. 4 is a schematic cross-sectional view of the second embodiment of a multi-phase dc motor. FIG. 6 is a plan view of a magnet portion M1 and yoke Y of the second embodiment. These are coaxially assembled with core 2 shown in FIG. 4 with a given air gap g. However, for convenience of description, the core 2 and the magnet portion M1 are separately shown. The field magnetic portion is omitted because it is the same as the conventional well-known twelve slot dc motor.

The three-phase motor of this embodiment is of twelve-magnetic-pole and ten-slot type and it comprises a core 2 having three-phase winding and ten slots, a field magnet portion M1 having twelve permanent magnetic poles as a circular array arranged at angularly equally spaced intervals around the core 2, N and S poles being arranged alternately, and a yoke Y provided around the field magnet portion. In this type of three-phase dc motor, either of the field magnetic portion or the core 2 is fixed and the other is rotatable.

Because the motor of this embodiment is of twelve-magnetic-pole and ten-slot type as mentioned above, the relation between the number P of magnetic poles and the number N of slots corresponds the case of n=6 in the equation of $$P=2n$$

$$N=2(n-1)$$

Thus, $$N/\phi=10/3=3.33\ldots$$

That is, this combination satisfies a condition that N is not m times $\phi$ where m is a natural number.

Under this condition, assuming that a total amount or the number of turns of a winding of one of protruding poles C11 to C20 is 100%, the amounts of the windings of the respective protruding poles C11 to C20 with respect to U-phase, W-phase, and V-phase are shown in TABLE 5.

TABLE 5

| SALIENT POLE | U PHASE | W PHASE | V PHASE |
|---|---|---|---|
| C11 | 100% | | |
| C12 | 66.6% | 33.3% | |
| C13 | | 100% | |
| C14 | | 33.3% | 66.7% |
| C15 | | | 100% |
| C16 | 100% | | |
| C17 | 66.7% | 33.3% | |
| C18 | | 100% | |
| C19 | | 33.3% | 66.7% |
| C20 | | | 100% |
| TOTAL | 333.2% | 333.2% | 333.2% |

Unlike the motor of the first embodiment, in this motor of the second embodiment, for example, windings of the U-phase comprise a winding L11, L12, L16, and L17, the windings L16 and L17 being positioned at a point-symmetrical position of the windings L11 and 12.

A frequency of cogging in this motor of the second embodiment is 60 in contrast to the prior art twelve-pole nine-slot motor having 36 occurrences of cogging per one rotation, so that degree of cogging is reduced.

Moreover, in this motor of the second embodiment cogging occurs at two points which is point-symmetrical with each other. Therefore, though one air gap out of the twelve air gaps g1 is smaller than the other air gap g, there is tendency that degree of cogging is not affected by eccentricity of the field magnet portion M1. This is because the air gap g2 located at the point-symmetric position is larger if the air gaps g1 is small, so that changes of cogging torques at these air gaps g1 and g2 cancel with each other.

What is claimed is:

1. A multi-phase dc motor comprising:
 (a) a field-magnet portion having P field magnetic poles positioned as a circular array at angularly equally spaced intervals; and
 (b) an armature having a plurality of cores positioned as N angularly equally spaced protruding poles providing N slots therebetween with $\phi$-phase coils disposed therein, wherein $\phi$ is a number of phases of the motor, with said field magnet portion or said armature being rotatable with respect to the other, wherein at least one of said protruding poles is provided with two or more phase coils of said $\phi$-phase coils and wherein P, N, and $\phi$ are defined by P=2n, N=2n±1, and N is not m times $\phi$ wherein n and m are integers.

2. A multi-phase dc motor comprising:
 (a) a field-magnet portion having P field magnetic poles positioned as a circular array at angularly equally spaced intervals; and (b) an armature having a plurality of cores positioned as N angularly equally spaced protruding poles providing N slots therebetween with $\phi$-phase coils disposed therein, wherein $\phi$ is a number of phases of the motor, either said field magnet portion or said armature being rotatable with respect to the other, wherein at least one of said protruding poles is provided with two or more phase coils of said $\phi$-phase coils; and wherein P, N, and $\phi$ are defined by $P=2n$, $N=2(n+1)$, and N is not m times $\phi$ wherein n and m are integers.

3. A multi-phase dc motor comprising:
(a) a field-magnet portion having P field magnetic poles, said P field magnetic poles positioned in a circular array at angularly equally space intervals; and
(b) an armature having N angularly equally spaced protruding poles, said N protruding poles having N slots therebetween for accommodating K-phase coils wound about said protruding poles, wherein K is an integer equal to the number of phases of the motor, said field magnet portion and said armature being rotatable relative to each other; and wherein, for n being an integer number, P, N, and K are defined by:
$P=2n$,
N is an integer differing from 2n by an integer; and and N is not an integer multiple of K.

4. A multi-phase dc motor as claimed in claim 3, wherein at least one of said protruding poles has a coil winding thereabout for at least two of said K-phases.

5. A multi-phase dc motor as claimed in claim 4, wherein $N=2n\pm 1$ so that N differs from 2n by one.

6. A multi-phase dc motor as claimed in claim 4, wherein:
said field-magnet portion has 8 field magnetic poles,
said armature has 7 angularly equally spaced protruding poles, and the number of phases of the motor is three.

7. A multi-phase dc motor as claimed in claim 6, wherein:
first and second protruding poles have coil windings wound thereabout for only a first phase of the motor;
third and forth protruding poles have coil windings wound thereabout for only a second phase of the motor;
a fifth protruding pole has a coil winding wound thereabout for only a third phase of the motor;
a sixth protruding pole has a coil winding thereabout including substantially two-thirds winding for said third phase of the motor and substantially one-third winding for said first phase of the motor; and
a seventh protruding pole has a coil winding thereabout including substantially two-thirds winding for said third phase of the motor and substantially one-third winding for said second phase of the motor.

8. A multi-phase dc motor as claimed in claim 3, wherein:
said field-magnet portion has 8 field magnetic poles,
said armature has 7 angularly equally spaced protruding poles, and the number of phase of the motor is three.

9. A multi-phase dc motor as claimed in claim 8, wherein:
first and second protruding poles have coil windings wound thereabout for only a first phase of the motor;
third and forth protruding poles have coil windings wound thereabout for only a second phase of the motor;
a fifth protruding pole has a coil winding wound thereabout for only a third phase of the motor;
a sixth protruding pole has a coil winding thereabout including substantially two-thirds winding for said third phase of the motor and substantially one-third winding for said first phase of the motor; and
a seventh protruding pole has a coil winding thereabout including substantially two-thirds winding for said third phase of the motor and substantially one-third winding for said second phase of the motor.

10. A multi-phase dc motor as claimed in claim 4, wherein $N=2(n\pm 1)$ so that N differs from 2n by two.

11. A multi-phase dc motor as claimed in claim 4, wherein:
said field-magnet portion has 12 field magnetic poles,
said armature has 10 angularly equally spaced protruding poles, and the number of phases of the motor is three.

12. A multi-phase dc motor as claimed in claim 11, wherein:
first and second protruding poles have coil windings wound thereabout for only a first phase of the motor;
third and forth protruding poles have coil windings wound thereabout for only a second phase of the motor;
fifth and sixth protruding poles have coil windings wound thereabout for only a third phase of the motor;
seventh and eighth protruding poles have coil windings wound thereabout including substantially two-thirds winding for said first phase of the motor and substantially one-third winding for said second phase of the motor; and
ninth and tenth protruding poles have coil windings wound thereabout including substantially two-thirds winding for said third phase of the motor and substantially one-third winding for said second phase of the motor.

13. A multi-phase dc motor as claimed in claim 3, wherein:
said field-magnet portion has 12 field magnetic poles,
said armature has 10 angularly equally spaced protruding poles, and the number of phases of the motor is three.

14. A multi-phase dc motor as claimed in claim 13, wherein:
first and second protruding poles have coil windings wound thereabout for only a first phase of the motor;
third and fourth protruding poles have coil windings wound thereabout for only a second phase of the motor;
fifth and sixth protruding poles have coil windings wound thereabout for only a third phase of the motor;
seventh and eighth protruding poles have coil windings wound thereabout including substantially two-thirds winding for said first phase of the motor and substantially one-third winding for said second phase of the motor; and
ninth and tenth protruding poles have coil windings wound thereabout including substantially two-thirds winding for said third phase of the motor and substantially one-third winding for said second phase of the motor.

* * * * *